(12) United States Patent
Avanzini et al.

(10) Patent No.: US 11,884,033 B2
(45) Date of Patent: Jan. 30, 2024

(54) METHOD AND STATION FOR APPLYING A SENSING DEVICE TO A TYRE

(71) Applicant: PIRELLI TYRE S.P.A., Milan (IT)

(72) Inventors: Lorenzo Avanzini, Milan (IT); Cristiano Puppi, Milan (IT); Albert Berenguer, Milan (IT); Matteo Accorra', Milan (IT); Erika Vaniglia, Milan (IT)

(73) Assignee: PIRELLI TYRE S.P.A., Milan (IT)

( * ) Notice: Subject to any disclaimer, the term of this patent is extended or adjusted under 35 U.S.C. 154(b) by 361 days.

(21) Appl. No.: 17/299,686

(22) PCT Filed: Dec. 2, 2019

(86) PCT No.: PCT/IT2019/050251
§ 371 (c)(1),
(2) Date: Jun. 3, 2021

(87) PCT Pub. No.: WO2020/121349
PCT Pub. Date: Jun. 18, 2020

(65) Prior Publication Data
US 2022/0024164 A1     Jan. 27, 2022

(30) Foreign Application Priority Data
Dec. 13, 2018    (IT) .................. 102018000011080

(51) Int. Cl.
*B29D 30/00*    (2006.01)

(52) U.S. Cl.
CPC .. *B29D 30/0061* (2013.01); *B29D 2030/0072* (2013.01); *B29D 2030/0077* (2013.01)

(58) Field of Classification Search
CPC ........ B29D 30/0061; B29D 2030/0072; B29D 2030/0077
See application file for complete search history.

(56) References Cited

U.S. PATENT DOCUMENTS

| 10,994,494 B2 * | 5/2021 | Clark .................... B29C 66/026 |
| 2017/0021579 A1 * | 1/2017 | Bambeck ............... H01Q 1/225 |
| 2018/0290413 A1 | 10/2018 | Marchini et al. |

FOREIGN PATENT DOCUMENTS

| CN | 106103064 A | 11/2016 |
| KR | 10-1418214 B1 * | 7/2014 |

(Continued)

OTHER PUBLICATIONS

International Search Report for International Application No. PCT/IT2019/050251 filed on Dec. 2, 2019, on behalf of Pirelli Tyre S.P.A. dated Jun. 2, 2020. 3 Pages.

(Continued)

*Primary Examiner* — Jeffry H Aftergut
(74) *Attorney, Agent, or Firm* — Steinfl + Bruno LLP

(57) ABSTRACT

A method and a related station for applying a sensing device to a tyre are described. A tape-shaped support with removably fixed sensing devices is advanced, to feed the sensing devices in sequence. A handling device is then rigidly coupled to a sensing device, maintaining at least a portion of an adhesion surface of the sensing device removably fixed to a support. The sensing device is then completely separated from the support, taken away by the handling device, and applied to an inner surface of a tyre by the handling device.

18 Claims, 8 Drawing Sheets

(56) References Cited

FOREIGN PATENT DOCUMENTS

| WO | 2013/111073 | A1 | 8/2013 |
| WO | 2018/065846 | A1 | 4/2018 |
| WO | 2018/116209 | A1 | 6/2018 |

OTHER PUBLICATIONS

Written Opinion for International Application No. PCT/IT2019/050251 filed on Dec. 2, 2019, on behalf of Pirelli Tyre S.P.A. dated Jun. 2, 2020. 4 Pages.
First Chinese Office Action Issued for Chinese Patent Application No. 201980087052.8 filed on Dec. 2, 2019, on behalf of Pirelli Tyre S.P.A. dated Apr. 25, 2022. 9 Pages.

* cited by examiner

METHOD AND STATION FOR APPLYING A SENSING DEVICE TO A TYRE

CROSS-REFERENCE TO RELATED APPLICATIONS

The present application is the U.S. National Stage of International Patent Application No. PCT/IT2019/050251 filed on Dec. 2, 2019 which, in turn, claims priority to Italian Patent Application No. 102018000011080 filed on Dec. 13, 2018.

TECHNICAL FIELD OF THE INVENTION

The present invention relates to a method and a station for applying a sensing device to a tyre.

STATE OF THE ART

Typically a tyre has a substantially toroidal structure around an axis of rotation thereof during operation, and it has an equatorial plane perpendicular to the axis of rotation, said equatorial plane being typically a plane of (substantial) geometric symmetry (e.g. neglecting possibly minor asymmetries, such as the tread design and/or the writing on the sides and/or structural or profile asymmetries).

The terms "radial" and "axial" are used with reference respectively to a direction substantially perpendicular and to a direction substantially parallel to the rotation axis of the tyre.

The term "tangential" is used with reference to a direction generally oriented according to the rolling direction of the tyre, substantially perpendicular to both the radial direction and the axial direction.

It is known producing tyres comprising a sensing device stably fixed to an inner surface of the tyre (typically at the tread band). In such tyres, the sensing device is usually used for the sensing of one or more physical quantities relating to the tyre within which it is fixed, such as, for example, typically, temperature, pressure, acceleration, deformation, etc., and for the sending of the collected information to a command and control unit, typically installed on a motor vehicle comprising such tyre, in order to establish and/or to implement feedback control dynamics and/or to provide a user with the collected data and/or information connected to them.

WO2013/111073 A1 describes a method for applying a detection device to a tyre for vehicle wheels by means of a positioning device.

WO 2018/065846 A1 describes a device for applying an electronic unit to the inner surface of a tyre, the device comprising a base made of a layer of elastomeric material on which the electronic unit is fixed at one side and coated with a pressure sensitive adhesive (PSA) at the other.

SUMMARY OF THE INVENTION

In the context of the production processes of tyres comprising a sensing device arranged in the inner cavity of the tyre, the Applicant has realized that it is preferable to sense the desired physical quantity, in particular the temperature, the deformation or the acceleration, directly on, or near to, the inner surface of the tyre at the tread band. For example, it is preferable a direct measurement of at least one of the radial, tangential and axial components of the acceleration undergone by an arbitrary point located on the inner surface at the tread band, which is subjected to stress and deformation due to the entry and exit cycle from the footprint, or more in general by the interaction between tyre and rolling surface. In this way it is possible to obtain, from the sensed acceleration signal, information about the status and/or about the instantaneous behaviour of the tyre during use (e.g. size of the footprint, wear, aquaplaning, slippage, etc.). Therefore, it is desirable to apply the acceleration sensor at a point close to where the greatest stresses are generated, such as typically a point on the inner surface located at the tread band.

The Applicant has realized to be advantageous, in order to ensure good performance of the sensing devices and therefore of the tyres themselves and/or of the motor vehicle, to ensure with an optimal repeatability (i.e. within limited geometric tolerances) the correct application of the sensing device inside of the tyre.

In particular, the Applicant has realized to be advantageous to ensure a precise angular orientation of the device with respect to a characteristic direction of the tyre (e.g. a direction parallel to the equatorial plane).

The sensing device can in fact be provided with an attachment portion to the tyre equipped with reinforcing wires, as for example described in WO 2018/065846 A1, in order to give suitable mechanical properties to the attachment portion, for example in terms of inextensibility.

Furthermore, the sensing device can be equipped with a sensor for sensing at least the tangential and/or axial component of the acceleration and/or of the deformation.

In such cases, the sensing device is characterized by a characteristic direction (determined for example in relation to the development of the aforesaid reinforcing wires and/or to the arrangement of the axes of the accelerometric and/or extensimetric sensor), which can be oriented (i.e. described by a unit vector) or not (i.e. described by a straight line).

The Applicant has realized to be advantageous that the sensing device is applied to the inner surface of the tyre so that such characteristic direction is precisely oriented, within a predetermined geometric tolerance, with respect to a characteristic direction of the tyre (for example the tangential direction). In this way, for example, the reinforcement wires optimally perform their mechanical function, and/or the accelerometric and/or extensimetric sensor correctly senses the axial and/or tangential components.

The Applicant has therefore faced the problem of realizing a method and a station for applying a sensing device to a tyre which allow with optimal repeatability a correct angular alignment of the sensing device itself within the tyre.

According to the Applicant one or more of the aforesaid problems are solved by a method and a station for applying a sensing device to a tyre according to the attached claims and/or having one or more of the following features.

According to an aspect the invention relates to a method for applying a sensing device to a tyre, the method comprising:

providing a support, having a tape-shaped conformation, and a plurality of sensing devices, each sensing device having a characteristic direction, wherein each sensing device is removably fixed to the tape-shaped support at an adhesion surface of said each sensing device;

providing a handling device having a respective characteristic direction;

feeding in sequence a set of tyres for vehicle wheels;

advancing said support for feeding in sequence said plurality of sensing devices along a respective feeding direction, wherein a first angular relation between said characteristic direction of each sensing device and said feeding direction is predetermined and it is equal for all the sensing devices;

for each tyre of said set of tyres, rigidly coupling said handling device to a respective sensing device maintaining at least a portion of said adhesion surface of said respective sensing device removably fixed to said support, wherein said rigid coupling is performed with a predetermined second angular relation between said characteristic direction of the handling device and said feeding direction to achieve a predetermined third angular relation between said characteristic direction of the handling device and said characteristic direction of said respective sensing device;

maintaining said third angular relation, completely separating said respective sensing device from said support and taking said respective sensing device away by said handling device;

maintaining said third angular relation, applying said respective sensing device to an inner surface of said each tyre by said handling device arranged in order to achieve a predetermined fourth angular relation between said characteristic direction of the handling device and a direction of intersection of an equatorial plane with the inner surface of said each tyre.

According to an aspect the invention relates to a station for applying a sensing device to a tyre, the station comprising:

a handling device having a respective characteristic direction;

a first apparatus comprising:
an advancement system for advancing a support, the support having a tape-shaped conformation and on which it is removably fixed a plurality of sensing devices at a respective adhesion surface of each sensing device, for feeding in sequence said plurality of sensing devices along a feeding direction, wherein a first angular relation between a characteristic direction of each sensing device and said feeding direction is predetermined and it is equal for all the sensing devices;

a coupling system for coupling said handling device with said each sensing device at a coupling bay wherein said each sensing device has at least a portion of said adhesion surface removably fixed to said support, the coupling system being configured to achieve a predetermined second angular relation between said characteristic direction of the handling device and said feeding direction to achieve a predetermined third angular relation between said characteristic direction of the handling device and said characteristic direction of said each sensing device, wherein the handling device is configured to rigidly maintain said third angular relation, a separation system for separating said support from each sensing device at a separation bay; and a second apparatus, comprising a positioning system for positioning a respective tyre for said each sensing device and an applying system for applying said each sensing device to an inner surface of the respective tyre, wherein the applying system comprises a housing seat of said handling device, the housing seat being structured to achieve a predetermined fourth angular relation between said characteristic direction of the handling device and a direction of intersection of an equatorial plane with the inner surface of said each tyre when positioned in the positioning system.

According to an aspect the invention relates to a handling device having a respective characteristic direction.

For the purpose of the identification of the direction of intersection of the equatorial plane with the inner surface, the portion of inner surface of the tyre around the sensing device is considered developed on a plane. This direction of intersection coincides with the tangential direction.

With the expression 'angular relation' referred to two directions it is meant a parameter representative of an angle between the two directions or (if they are not incident) between two directions incident and parallel to the above said directions.

The expression 'predetermined' referred to an angular relation means a specific value of the aforesaid parameter, which can also vary as a function of different factors such as the type of the sensing device and/or of the tyre, except for the geometrical tolerances depending on the circumstances, for example the manufacturing tolerances, the positioning tolerances, etc. For example, one or more of the predetermined angular relations can have a tolerance of +/−5°, or of +/−3°.

The expressions upstream, downstream and the like are referred to the feeding direction, which is oriented.

According to the Applicant, the combination of the aforesaid features, in particular the achievement and maintaining of the predetermined first, second, third and fourth angular relation achieves a sequence of suitable relative angular orientations consequential to each other, which allows to rigidly correlate the initial angular orientation (i.e. on the support) to the final orientation (i.e. when applied on the tyre) of the characteristic direction of the sensing device and thus to control such final orientation.

The present invention in one or more of the aforesaid aspects can have one or more of the following preferred features.

Preferably by characteristic direction it is meant an oriented direction (e.g. identified by a respective unit vector).

Preferably it is provided, previously to said rigidly coupling said handling device to said respective sensing device, partially separating said respective sensing device from said support (only) maintaining said portion of adhesion surface removably fixed to said support.

Preferably said separation system is configured to maintain said portion of adhesion surface removably fixed to said support when said each sensing device is in the separation bay. Preferably said coupling bay coincides with said separation bay.

In this way it is possible to couple the respective sensing device and the handling device when the respective sensing device is at standstill in the separation bay.

In an alternative embodiment, it is provided rigidly coupling said handling device to said respective sensing device maintaining said adhesion surface removably and entirely fixed to said support.

Preferably said coupling bay is upstream of said separation bay.

In this way the risk of losing and/or jeopardising the first angular relation during the rigid coupling is reduced.

Preferably said completely separating said respective sensing device from said support occurs (substantially) simultaneously with said taking said respective sensing device away by said handling device. In other words, it is the handling device that completely separates the respective sensing device from the support during the taking away operation, i.e. during the physical removal of the sensing device from the separation bay. The Applicant has in fact verified that by carrying out the aforesaid steps (substantially) simultaneously it is possible to reduce the operating times, with respect to the case in which the two steps are carried out in sequence, with consequent advantages in terms of productivity.

Preferably said coupling system is placed at said separation bay. In this way it is possible coupling and separating with the sensing device at standstill in the separation bay.

Preferably separating, completely and/or partially, the respective sensing device from the support comprises advancing said support and turning said support around an edge, more preferably with acute angle.

Preferably the separation system comprises an edge, preferably with acute angle, more preferably with transversal development, at the separation bay.

In this way the support sliding around the edge moves away, progressively separating itself, from the sensing device.

Preferably said coupling system comprises a guide shaped for removably and slidably housing said handling device. Preferably said guide is shaped to allow the handling device to slide along a direction (substantially) perpendicular to a lying plane of the adhesion surface.

Preferably rigidly coupling said handling device to said respective sensing device comprises displacing said handling device along a direction (substantially) perpendicular to a lying plane of said adhesion surface.

In this way the handling device, when housed in the guide, can rigidly be coupled with, and separates from the support, the sensing device by sliding along the guide.

Preferably said guide is structured for housing said handling device with a predetermined angular orientation about an axis perpendicular to said lying plane.

Preferably said coupling system comprises a fixed frame (e.g. with respect to said support in advancement and/or to a frame of the first apparatus) and a movable frame to which it is rigidly fixed said guide. Preferably said movable frame is structured to be able to displace, with respect to said fixed frame, along a transversal direction perpendicular to said feeding direction and parallel to said lying plane, more preferably in both directions.

Preferably it is provided being able to displace said perpendicular displacement direction of said handling device along a transversal direction perpendicular to said feeding direction and parallel to said lying plane.

The Applicant has in fact observed that the sensing devices in sequence on the support could not be perfectly aligned moving along the feeding direction (i.e. they could be displaced along the transversal direction). With the aforesaid solution it is possible to transversally centre in optimal way the handling device with respect to the position of the sensing device in the coupling/separation bay.

In an embodiment said coupling system comprises a further guide integral with said movable frame and having main development along said feeding direction.

Preferably said further guide is shaped to be slidably engaged by said each sensing device upstream of said guide, more preferably by a single sensing device at a time Preferably said further guide comprises an invitation portion, in distal position with respect to said guide, having inclined walls converging moving along said feeding direction. In this way each sensing device advancing along the invitation portion transversally centres the further guide, and with that also the guide, with respect to itself, in a completely passive way.

In an alternative embodiment said coupling system comprises a sensing system of a transversal position of said each sensing device, when at said coupling system.

Preferably said coupling system comprises a transversal moving system of said movable frame commanded as a function of said transversal position of said each sensing device. In this way the guide is transversely and automatically centred with respect to the transversal position of each sensing device.

Preferably said portion of adhesion surface is greater than or equal to 1%, more preferably greater than or equal to 2%, and/or less than or equal to 60%, more preferably less than or equal to 50%, even more preferably less than or equal to 30%, of the whole adhesion surface. The chosen percentage depends on different factors, such as the adhesive type, the adhesion force, etc. In this way it is favoured the maintaining of the first angular relation during the rigidly coupling step, and it is eased at the same time the complete separation of the sensing device from the support (for example by reducing the force needed by the handling device for taking the sensing device away).

Preferably each sensing device comprises an adhesive (more preferably a pressure sensitive adhesive or 'PSA') at said respective adhesion surface. In this way each device is removably fixed to the support by means of the adhesive. The support is configured as an anti-adhesive protection film for the adhesive itself, which is used to maintain each sensing device applied to the respective tyre.

Preferably said first apparatus comprises a supporting system for supporting a further portion of adhesion surface complementary to said portion of adhesion surface (i.e. the portion of adhesion surface separated from the support). Preferably said supporting system is placed at said separation bay. Preferably said supporting system comprises a respective non-stick supporting surface. Preferably said supporting system comprises (more preferably consists of) one or more transporting rollers, arranged side by side, more preferably with respective rotation axes parallel and perpendicular to said feeding direction, more preferably idler rollers.

Preferably separating, completely and/or partially, said respective sensing device from said support comprises resting a further portion of adhesion surface of said respective sensing device onto a supporting surface, said further portion of adhesion surface being separated from said support and said supporting surface being non-stick.

In this way it is provided a support for the further portion of adhesion surface of each sensing device during the separation of the latter from the support.

Preferably it is provided stopping said advancing of said support before said rigidly coupling said handling device to said respective sensing device.

Preferably said first apparatus comprises a command and control unit.

Preferably said coupling system comprises a system for sensing a longitudinal position of said each sensing device along said feeding direction, more preferably when at the coupling bay. For example, the system for sensing may comprise a photocell system arranged transversely with respect to the feeding direction at the coupling bay. Preferably said system for sensing is programmed to send to said command and control unit a signal identifying said longitudinal position. Preferably said command and control unit is programmed to stop said advancement system of the support as a function of said signal identifying said longitudinal position.

In this way when the sensing device reaches the correct longitudinal position with respect to the coupling system, it is stopped to ease the coupling.

Preferably said handling device comprises a main body having a main development direction (which defines a longitudinal direction of the handling device).

Preferably said main body comprises an engagement portion externally counter-shaped to said guide and placed in position proximal to a first longitudinal end.

Preferably said handling device comprises, at a first longitudinal end, a coupling seat counter-shaped to said sensing device.

Preferably rigidly coupling said handling device to said respective sensing device comprises fitting said coupling seat onto said sensing device.

Preferably at least a superficial portion of said coupling seat is elastic and it has a cross-section smaller than a corresponding cross-section of said sensing device (in this way the sensing device is stably and rigidly coupled to the handling device by elastic deformation and friction).

Preferably the handling device comprises at said first longitudinal end an elastic body (e.g. a body made of polyurethane or silicone or rubber, e.g. silicone or acrylic) within which said coupling seat is obtained, more preferably the elastic body being fixed to said engagement portion. The insertion of the sensing device in the coupling seat entails an elastic deformation of the walls of the seat itself, which generates a retraction force which acts on the sensing device, in order to hold it in position by friction. Moreover, during the application of the sensing device to the tyre, the elastic body allows a uniform transfer of the thrust pressure from the handling device to the sensing device.

Preferably taking said sensing device away from said support comprises retaining said respective sensing device by means of said coupling seat, more preferably through retraction force exerted by an elastic deformation of said coupling seat.

Preferably said main body comprises an inner cavity with longitudinal development and a central thrust element slidably housed in said inner cavity and structured to assume an at-rest position, backward with respect to the first end, and a thrust position, advanced with respect to the first end. Preferably said handling device comprises an elastic element operatively interposed between said main body and said central thrust element, and structured to oppose an elastic reaction to a displacement of said central thrust element from said at-rest position to said thrust position. In this way in absence of external forces acting on the central thrust element, the elastic element tends to return the central thrust element to the at-rest position.

Preferably said engagement portion comprises a first portion of a first mechanical key coupling and said guide comprises a second portion of said first mechanical key coupling counter-shaped to said first portion.

Preferably said main body comprises, in position distal from said first longitudinal end, a first portion of a second mechanical key coupling and said housing seat comprises a second portion of said second mechanical key coupling counter-shaped to said first portion.

Preferably applying said respective sensing device to an inner surface of said each tyre comprises applying a first force to a central portion of said respective sensing device (e.g. by means of the central thrust element). Preferably it is provided maintaining constant said first force for a time greater than or equal to 0.5 seconds, more preferably greater than or equal to 1 seconds, and/or less than or equal to 10 seconds, more preferably greater less than or equal to 5 seconds. Preferably it is provided subsequently applying a second force to a peripheral annular portion of said respective sensing device, and preferably also to said central portion, more preferably maintaining said first force. Preferably it is provided maintaining constant said second force for a time greater than or equal to 0.5 seconds, more preferably greater than or equal to 1 seconds, and/or less than or equal to 10 seconds, more preferably greater less than or equal to 5 seconds. In this way it is simplified the application of the sensing device to the inner surface of the tyre, making easier its bonding with adhesive. Proceeding with the application of the forces from the center to the periphery of the sensing device, it is possible to obtain an optimal bonding since it facilitates the expulsion of any air bubbles between the adhesive and the inner surface of the tyre.

Preferably said applying system comprises a first actuator for longitudinally moving said main body of the handling device and preferably a second actuator for moving said central thrust element from the at-rest position to the thrust position. In this way it is possible applying the forces as described above.

Preferably said positioning system comprises a centring system for centring said respective tyre with respect to said applying system. Preferably said centring system comprises a pair of mutually facing and parallel surfaces, the surfaces being symmetrically movable with respect to a median plane parallel to the surfaces and placed according to a predetermined spatial relation with respect to the applying system. In this way the two facing surfaces, brought into contact to the axially outer surfaces of the tyre, bring the equatorial plane of the tyre on the median plane, achieving both an axial centring and a correct angular alignment of the equatorial plane.

Preferably said second apparatus comprises a supporting plane of said tyre, the supporting plane comprising a detector of a thrust exerted by said tyre onto the supporting plane, wherein the supporting plane is movable along a radial direction of said tyre, when present. In this way it is possible monitoring (e.g. by subtraction with respect to the weight of the tyre), for the purposes of conformity and/or safety of the operations, the thrust force exerted by the applying system on the inner surface of the tyre by the handling device, during the application of the sensing device.

BRIEF DESCRIPTION OF THE DRAWINGS

The features and advantages of the present invention will be further clarified by the following detailed description of some embodiments, presented by way of non-limiting example of the present invention, with reference to the attached figures, in which.

DETAILED DESCRIPTION OF SOME EMBODIMENTS OF THE INVENTION

Figure 8:
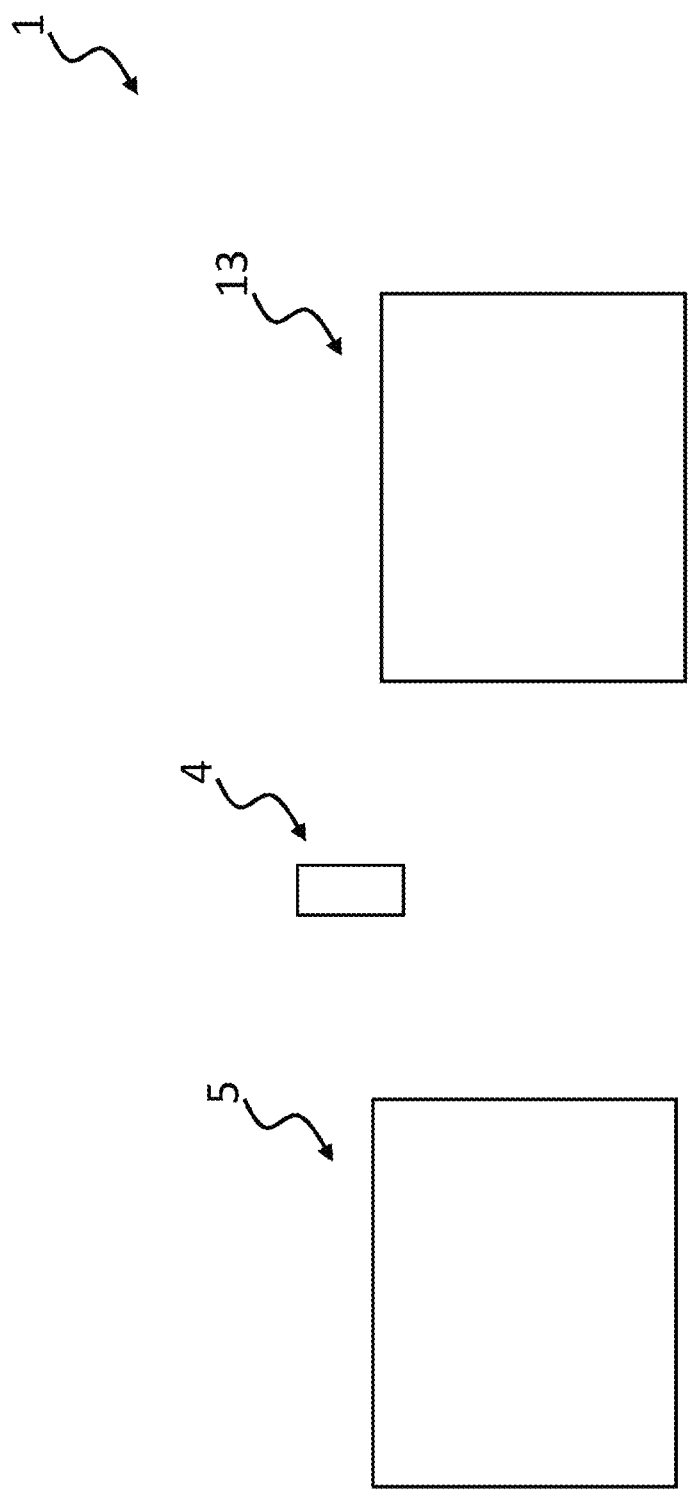
FIG. 8 shows a schematic view of a station according to the present invention.

In FIG. 8 with the number 1 it is identified a station for applying a sensing device 2 to a tyre 3. The station 1 comprises a handling device 4 having a respective characteristic direction A, a first apparatus 5 and a second apparatus 13.

Figure 1:
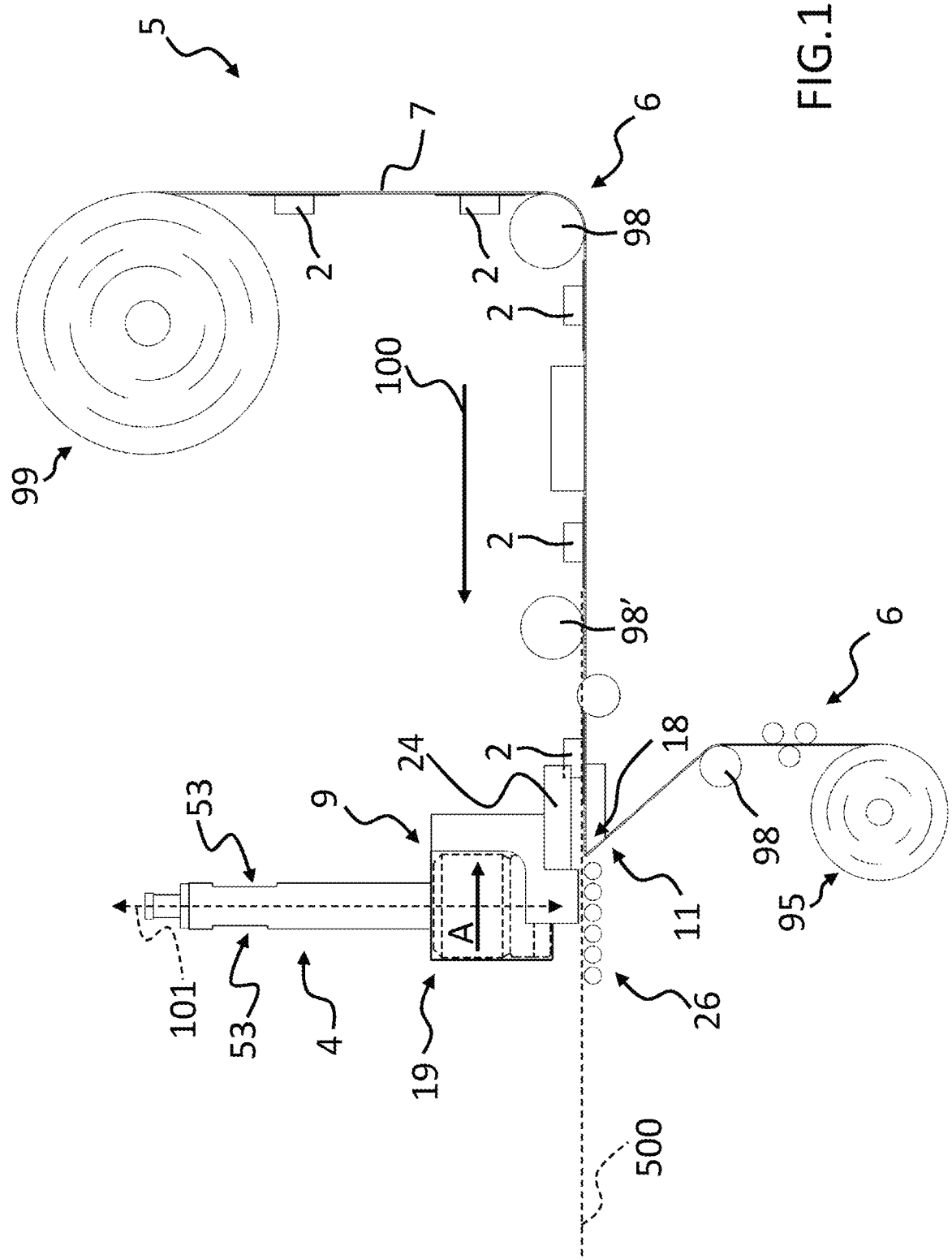
FIG. 1 shows a schematic and partial side view of a first apparatus of a station according to the present invention.
Figure 2:
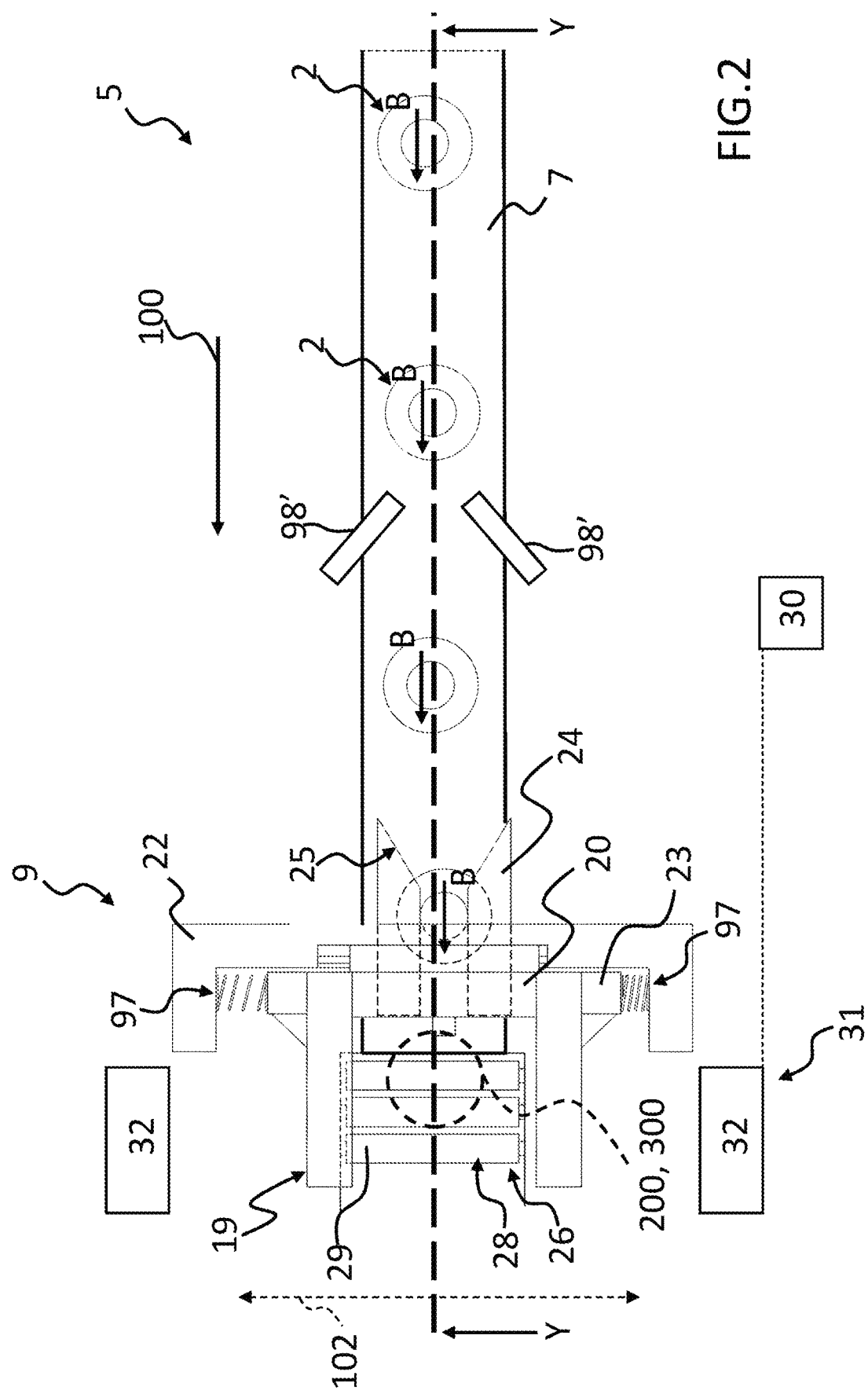
FIG. 2 shows a schematic and partial plant view of the first apparatus of FIG. 1.

The first apparatus 5 comprises an advancement system 6 (schematically shown in FIG. 1) of a support 7, having a tape-shaped conformation and on which a plurality of sensing devices 2 is removably fixed at a respective adhesion surface 8 of each sensing device 2, for feeding in sequence the plurality of sensing devices 2 along a feeding direction 100. A first angular relation (exemplarily of parallelism as shown in FIG. 2) between a characteristic direction B of each sensing device 2 and the feeding direction 100 is predetermined and it is equal for all the sensing devices 2.

The characteristic directions B of each sensing device 2 are exemplarily shown concordant with the feeding direction 100.

Exemplarily the advancement system 6 comprises a plurality of advancement rollers 98 including a pair of tensioning rollers 98' (shown in FIGS. 1 and 2) arranged symmetrically with respect to the support 7 and inclined in a divergent way along the feeding direction 100. Such tensioning rollers contribute to maintain the support in tension along the downstream section. The advancement system 6 unrolls the support from an initial reel 99, in which the support is wound together with the sensing devices, and it guides the support along a precise path up to a final reel 95, in which the support, separated from the sensing devices, is rewound.

Figure 7:
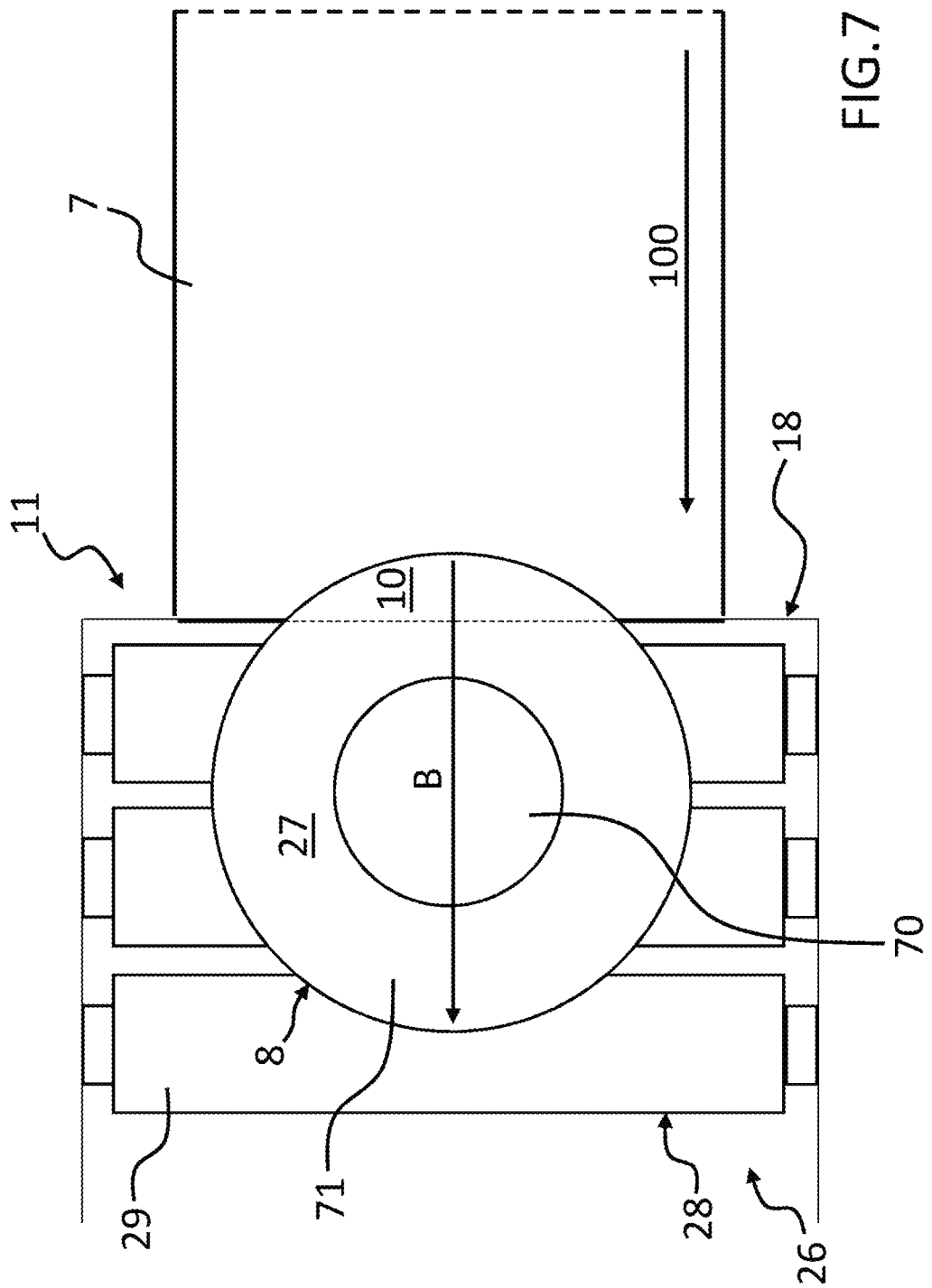
FIG. 7 shows a detail of FIG. 2.

The first apparatus 5 comprises a coupling system 9 between the handling device 4 and each sensing device 2 at a coupling bay 200 in which each sensing device 2 has a portion 10 of the adhesion surface 8 (equal to about 6% of the adhesion surface 8) removably fixed to the support 7 (FIG. 7). The coupling system 9 is configured to achieve a predetermined second angular relation, exemplarily of parallelism, between the characteristic direction A of the handling device 4 and the feeding direction 100 (exemplarily shown discordant to each other).

The first apparatus 5 comprises a separation system 11 for separating the support 7 from each sensing device 2 at a separation bay 300.

Figure 4:
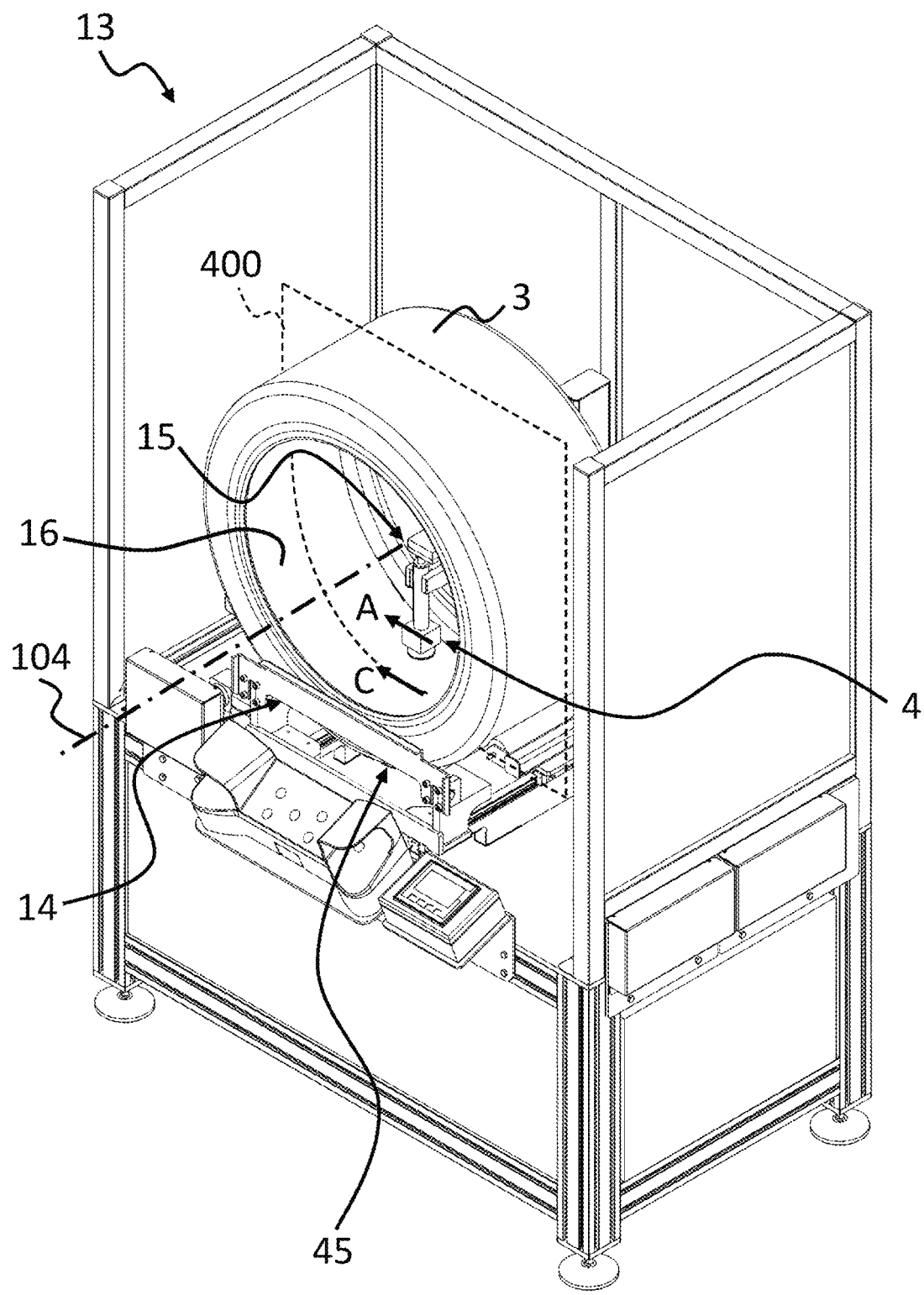
FIG. 4 shows a perspective view of a second apparatus of a station according to the present invention.

The second apparatus 13 comprises a positioning system 14 for positioning a respective tyre 3 for each sensing device 2 and an applying system 15 for applying each sensing device 2 to an inner surface 16 of the respective tyre 3, wherein the applying system 15 comprises a housing seat 17 of the handling device 4, the housing seat 17 being structured to achieve a predetermined fourth angular relation, exemplarily of parallelism (FIG. 4), between the characteristic direction A of the handling device 4 and a direction of intersection C of an equatorial plane 400 with the inner surface 16 of each tyre 3 when positioned in the positioning system 14.

Exemplarily by characteristic direction A and B it is meant an oriented direction, identified by a respective unit vector, as arbitrarily shown in the figures. Each characteristic direction A and B can be arbitrarily chosen relatively to a natural characteristic direction, for example identified by the development direction of the possible reinforcing wires of the attachment portion of the sensing device, or by the direction of a sensing axis of the possible accelerometric sensor present in the sensing device, this sensing axis having to coincide with the tangential component of the acceleration undergone by the sensing device, or moreover by the development direction of the side surfaces of the handling device 4. Exemplarily the first, the second, the third (better described in the following) and the fourth angular relation are of parallelism, they therefore imply a parameter representative of an angle between the two characteristic directions respectively involved in the aforesaid angular relations equal to about 0° (except for the geometrical tolerances depending on the circumstances, such as for example the manufacturing tolerances, the positioning tolerances, etc.) Exemplarily each angle implied by each of the aforesaid angular relations is comprised in the range 0°+/−3°.

Exemplarily the separation system 11 is configured to maintain the portion 10 of adhesion surface 8 removably fixed to the support 7 when each sensing device 2 is in the separation bay 300, the latter exemplarily coinciding with the coupling bay 200.

Consequently, as exemplarily shown, the coupling system 9 is placed at the separation bay 300.

Exemplarily the separation system 11 comprises an edge 18 with acute angle with transversal development (laterally shown in FIGS. 1 and 3) placed at the separation bay 300.

Exemplarily the coupling system 9 comprises a guide 19 shaped for removably and slidably housing the handling device 4. Exemplarily the guide 19 is shaped to allow the handling device 4 to slide along a direction 101 perpendicular to a lying plane 500 of the adhesion surface 8. Exemplarily, as shown in FIG. 1, after a first bend downstream of the initial reel 99, the support 7 slides advancing along the feeding direction 100 lying on a single plane, which coincides with the lying plane 500, until it reaches the edge 18 (e.g. there are not provided further folds or changes in height or twists of the support).

Figure 3:
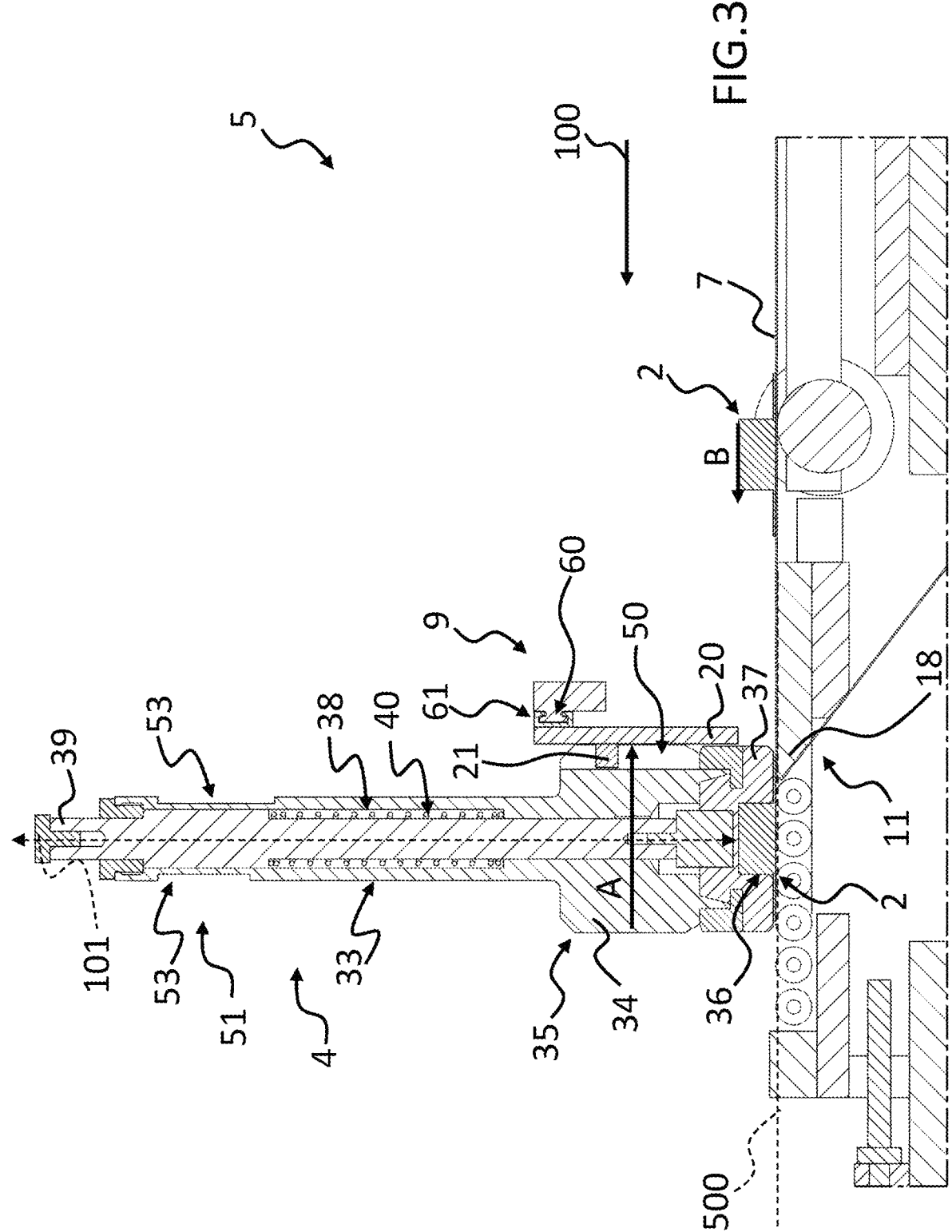
FIG. 3 shows a schematic and partial view of a section on the plane Y-Y of FIG. 2.

Exemplarily the guide 19 is structured for housing the handling device 4 with a predetermined angular orientation about an axis perpendicular to the lying plane 500 (this axis being parallel to the sliding direction 101 of the handling device 4). In other words, the characteristic direction A of the handling device 4, when the latter is slidably housed in the guide 19, is determined with respect to the feeding direction 100 (for example parallel and discordant with respect to the latter, as shown in FIGS. 1 and 3).

For this purpose, exemplarily, as shown in FIG. 2, the guide 19 defines a housing volume of the handling device 4 having straight parallelepiped shape with rectangular base parallel to the lying plane 500. Exemplarily the housing volume is closed only at three of its four vertical sides, missing the wall of the guide at opposite position with respect to the support (FIG. 2). Exemplarily the guide 19 comprises a wall 20 having a respective surface portion facing the housing volume counter-shaped to a respective surface portion of the handling device 4. Exemplarily a relief 21 protruding from the respective surface portion of the wall 20 of the guide 19 slidably engages a corresponding seat 50 made on the respective surface portion of the handling device 4.

Exemplarily the coupling system 9 comprises a fixed frame 22 (with respect to the advancing support 7) and a movable frame 23 to which the guide 19 is rigidly fixed.

Exemplarily the movable frame 23 is structured to be able to displace, with respect to the fixed frame 22, in both directions along a transversal direction 102 perpendicular to the feeding direction 100 and parallel to the lying plane 500. The fixed frame 22 comprises a track 60 and the movable frame 23 comprises a carriage 61 slidably fixed on the track 60 to allow the displacement of the movable frame along the transversal direction 102.

Exemplarily the coupling system 9 comprises a pair of elastic elements 97 (e.g. two springs) operatively interposed between the fixed frame 22 and the movable frame 23 to return and maintain the movable frame in an equilibrium position, centred with respect to the support 7, in absence of external forces. Exemplarily the displacement of the movable frame 22 along the transversal direction 102, with respect to the equilibrium position maintained by the elastic elements, is equal to about +/−2 mm.

In the shown embodiment, the coupling system 9 comprises a further guide 24 integral with the movable frame 23 and having main development along the feeding direction 100. Exemplarily the further guide 24 is shaped to be slidably engaged by a single sensing device 2 at a time, upstream of the separation bay 300, and it comprises an invitation portion 25, in distal position from the separation bay 300, having inclined walls converging moving along the feeding direction 100. The elastic elements 97 are suitably sized to allow a displacement of the movable frame 23 during the advancement of the sensing device along the invitation portion 25 of the further guide 24, to allow the guide 19 to autonomously and passively align itself with respect to the transversal position of the sensing element occupying the further guide (in FIG. 2 the guide 19 is shown displaced with respect to the equilibrium position according to the transversal position on the support 7 of the sensing device which slidably occupies the further guide 24).

In an alternative embodiment (not shown) the coupling system is active and it can comprise a sensing system for sensing a transversal position of each sensing device, when at the coupling system, and a transversal moving system for moving the movable frame, transversal moving system being controlled as a function of the transversal position of each sensing device.

Exemplarily each sensing device 2 comprises a pressure sensitive adhesive or "PSA" (not shown) deposited on the respective adhesion surface 8 for adhering to the support 7.

Exemplarily the first apparatus 5 comprises a supporting system 26 for supporting a further portion 27 of adhesion surface 8 complementary to the aforesaid portion 10 of adhesion surface. Exemplarily the supporting system 26 is placed at the separation bay 300, it comprises a respective non-stick supporting surface 28 and it consists of idler transporting rollers 29, arranged side by side, with respective rotation axes parallel and perpendicular to the feeding direction 100. The supporting surface 28 is exemplarily constituted by the outer surfaces of the rollers 29.

Exemplarily the first apparatus 5 comprises a command and control unit 30 (only schematically shown in FIG. 2).

Exemplarily the coupling system 9 comprises a system 31 (only schematically shown in FIG. 2) for sensing a longitudinal position of each sensing device 2 along the feeding direction 100, when at the separation bay 300. Exemplarily the system 31 for sensing comprises a photocell system 32 (only schematically shown in FIG. 2) transversally arranged with respect to the feeding direction 100 at the separation bay 300. Exemplarily the system 31 for sensing is programmed to send a signal identifying the longitudinal position to the command and control unit 30 and the command and control unit 30 is programmed to stop the advancement system 6 of the support 7 as a function of the signal identifying the longitudinal position.

Exemplarily the handling device 4 comprises a main body 33 having a main development direction, which defines a longitudinal direction of the handling device (in the figures it coincides with the direction 101).

Exemplarily the main body 33 comprises an engagement portion 34 externally counter-shaped to the guide 19 and placed in position proximal to a first longitudinal end 35. Exemplarily the handling device 4 comprises, at the first longitudinal end 35, a coupling seat 36 (shown in FIG. 3) counter-shaped to the sensing device 2.

Exemplarily the handling device 4 comprises, at the first longitudinal end 35, an elastic body 37 made of polyurethane within which the coupling seat 36 is obtained, the elastic body 37 being fixed to the engagement portion 34 and having a cross-section smaller than a corresponding cross-section of the sensing device 2.

Exemplarily the main body 33 comprises an inner cavity 38 with longitudinal development and a central thrust element 39 slidably housed in the inner cavity 38 and structured to assume an at-rest position (shown in FIG. 3), backward with respect to the first end 35, and a thrust position (not shown), advanced with respect to the first end 35. Exemplarily the handling device 4 comprises an elastic element 40 operatively interposed between the main body 33 and the central thrust element 39 and structured to oppose an elastic reaction to a displacement of the central thrust element 39 from the at-rest position to the thrust position.

Exemplarily the engagement portion 34 comprises a first portion, coinciding with the previously described seat 50, of a first mechanical key coupling and the guide 19 comprises a second portion, coinciding with the previously described pin 21, of the first mechanical key coupling counter-shaped to the first portion.

Figure 5:
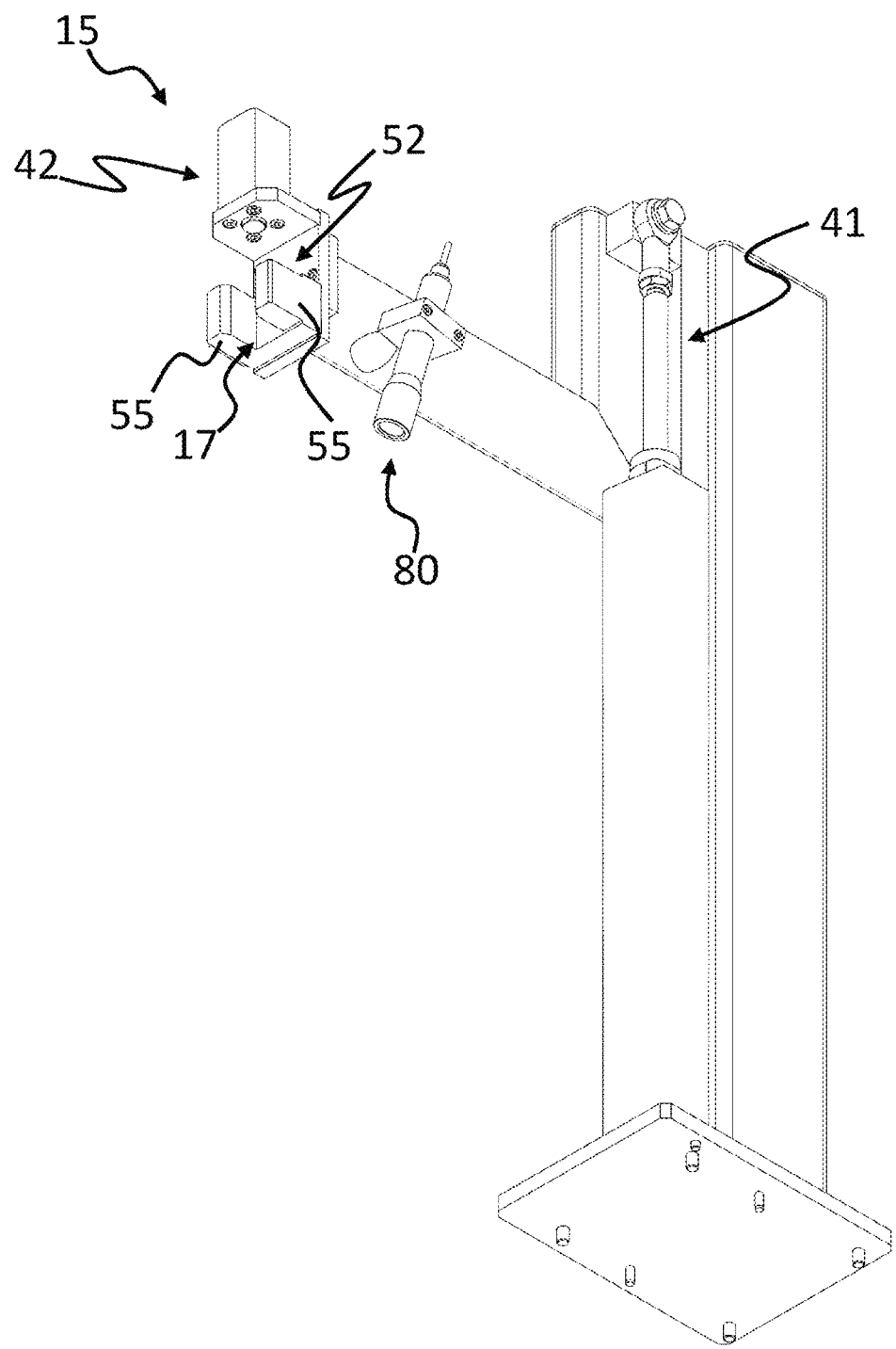
FIG. 5 shows a partial and perspective view of an applying system of the second apparatus of FIG. 5.

Exemplarily the main body 33 comprises, in distal position from the first longitudinal end 35, a first portion 51 of a second mechanical key coupling and the housing seat 17 comprises a second portion 52 of the second mechanical key coupling counter-shaped to the first portion 51. The first portion 51 consists of a pair of recesses 53 made at a second longitudinal end of the main body 33 opposite to the first longitudinal end 35, and having different longitudinal length (exemplarily the recess on the left in FIG. 3 is longitudinally shorter than the recess on the right). The corresponding second portion 52 consists of a pair of walls 55 (shown in FIG. 5) of the housing seat 17 having different length to fit in only one way with the longitudinal length of the recesses 53.

Exemplarily the applying system 15 (partially shown in FIG. 5) comprises a first actuator 41 (only partially shown) for longitudinally moving the main body 33 and a second actuator 42 (only partially shown) for moving the central thrust element 39 from the at-rest position at the thrust position.

Figure 6:
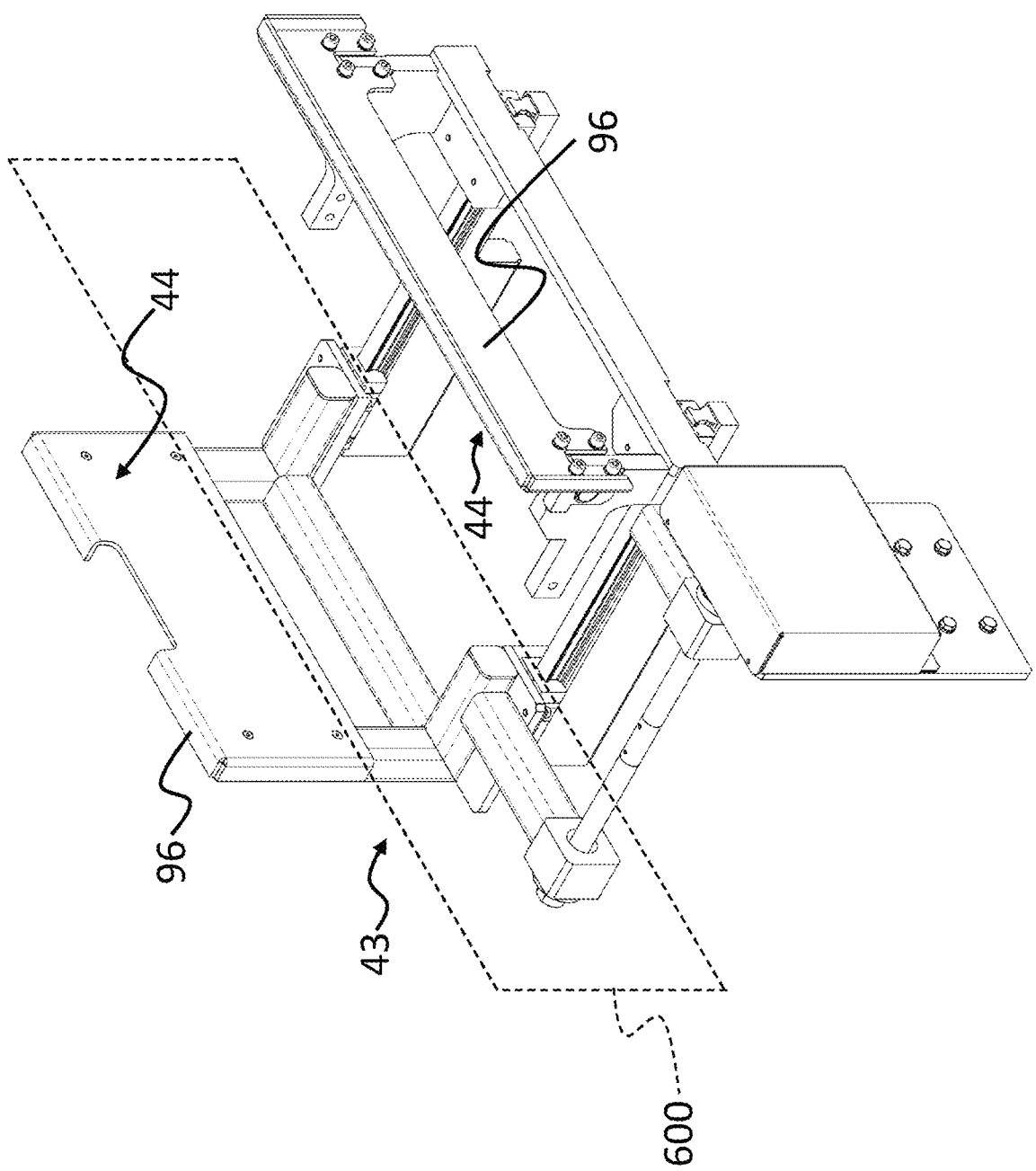
FIG. 6 shows a partial and perspective view of a positioning system of the second apparatus of FIG. 5.

Exemplarily the positioning system 14 comprises a centring system 43 for centring the respective tyre 3 with respect to the applying system 15. Exemplarily the centring system 43 (partially shown in FIG. 6) comprises a pair of surfaces 44, obtained by two bulkheads 96, mutually facing and parallel, symmetrically movable with respect to a median plane 600 parallel to the surfaces 44 and placed in order to coincide with the equatorial plane 400 of a respective tyre 3 when placed in the centring system 43 with both the bulkheads 96 brought into contact with axially outer surfaces of the tyre 3.

Exemplarily the second apparatus 13 comprises a supporting plane 45 (only partially visible in FIG. 4 under the tyre) of the tyre 3, the supporting plane 45 comprising a detector (not shown) of a thrust (exemplarily a load cell) exerted by the tyre 3 onto the supporting plane 45, wherein the supporting plane 45 is movable along a radial direction of the tyre 3, when present.

Exemplarily the applying system 15 comprises a laser source 80, able to emit a laser beam in direction of the supporting plane 45 in order to provide a reference for a correct alignment and/or centring of the tyre 3 when positioned on the supporting plane 45.

Exemplarily each sensing device 2 comprises an electronic unit (not shown) and an electric power supplier (not shown) electrically connected to the electronic unit.

Preferably the electronic unit comprises at least one sensor, a processing unit and a transceiver (not shown). Preferably the sensor is suitable for sensing at least one of the following physical quantities: temperature, pressure, acceleration, deformation. In the case of the acceleration and/or of the deformation, the sensor is suitable for sensing preferably at least one radial component and/or a tangential component of the acceleration and/or of the deformation.

The use of the station 1 allows to implement a method for applying a sensing device 2 to a tyre 3, wherein the method exemplarily comprises:

feeding in sequence a set of tyres for vehicle wheels to the second apparatus 13;

for each tyre 3 of the set of tyres, advancing a respective sensing device 2 until the latter is at the separation bay 300. During its displacement along the feeding direction 100, the respective sensing device 2 slidably engages the further guide 24, centring, in passive way, also the guide 19 (thanks to the movable frame 23) with respect to a position assumed by the respective sensing device itself when in the separation bay 300.

The advancement of the respective sensing device 2 up to the separation bay is achieved by the sliding of the support 7 which, by folding around the edge 18 with acute angle, partially separates itself from the respective sensing device 2. Only the portion 10 of adhesion surface 8 remains removably fixed to the support, while the further portion 27 of adhesion surface 8, separated from the support, rests on the non-stick supporting surface 28 of the rollers. At this point the system 31 for sensing senses the longitudinal position of the respective sensing device, along the feeding direction 100, and sends a signal identifying this longitudinal position to the command and control unit 30. If the longitudinal position is correct, i.e. the correct partial separation of the respective sensing device from the support 7 has occurred, the command and control unit 30 stops the advancement of the support 7. The respective sensing device 2 therefore stops in the separation bay 300, which exemplarily coincides with the coupling bay 200 (the sensing device is therefore, both transversely and longitudinally, centred with respect to the guide 19).

The handling device 4 is inserted in the guide 19 according to the first mechanical key coupling (i.e. the pin 21 slidably engages the seat 50), which achieves the second angular relation of parallelism between the characteristic direction A of the handling device 4 and the feeding direction 100. This consequently achieves a predetermined third angular relation of parallelism between the characteristic direction A of the handling device 4 and the characteristic direction B of the respective sensing device 2 (partially fixed to the support 7, in order to still maintain the first angular relation).

In an alternative embodiment (not shown), it is provided rigidly coupling the handling device to the respective sensing device maintaining the adhesion surface removably and entirely fixed to the support. In this alternative embodiment, the coupling bay is located upstream of the separation bay.

The handling device 4 is then slid in the guide 19 along the direction 101, in order to rigidly couple the handling device 4 to the respective sensing device 2. The handling device 4 falls vertically downwards until the respective sensing device 2 occupies the coupling seat 36 of the handling device. The insertion of the sensing device 2 in the coupling seat 36 involves an elastic deformation of the walls of the seat itself, which generates a retraction force which acts on the respective sensing device, in order to hold it in position by friction. In this way the handling device 4 is able to rigidly maintain the third angular relationship in the subsequent steps.

Subsequently, maintaining the third angular relationship thanks to the coupling seat 36, the respective sensing device 2 is completely separated from the support 7 and at the same time the respective sensing device 2 is taken away by means of the handling device 4, by vertically lifting the latter along the guide 19. The respective sensing device 2 is retained by means of the coupling seat 36.

Still maintaining the third angular relationship, the handling device 4 is housed in the housing seat 17 of the applying system 15, according to the second mechanical key coupling, which allows to obtain a unique positioning of the handling device 4 with respect to the whole applying system 15. This unique positioning allows to achieve, once the tyre 3 is aligned by means of the centring system 43, the application of the respective sensing device 2 to the inner surface 16 of the tyre 3 according to the predetermined fourth angular relation of parallelism between the characteristic direction A of the handling device 4 and the direction of intersection C of the equatorial plane 400 with the inner surface 16 of the tyre 3. The fourth angular relation ensures, thanks to the appropriate angular relations carried out in sequence, a correct final alignment between the characteristic direction B of the respective sensing device 2 and the direction of intersection C of the tyre, exemplarily parallel to each other (angle between the direction B and the direction C equal to 0°+/−3°.

Before performing the application of the respective sensing device to the inner surface 16 of the tyre, the tyre is arranged on the supporting plane 45 with the respective rotation axis 104 arranged horizontally and perpendicular to the two bulkheads 96. At this point the front bulkhead 72 is raised (initially in lowered position to facilitate the positioning of the tyre), and both the bulkheads 96 are displaced symmetrically with respect to the median plane 600, until they come into contact with axially outer surfaces of the tyre, so as the median plane 600 coincides with the equatorial plane 400 of the tyre. At this point it is exemplarily provided to (manually or automatically) rotate the tyre about the respective rotation axis 104 in order to center the portion of inner surface 16, on which the respective sensing device will be applied, with respect to a vertical to the handling device 4 suitably housed in the housing seat 17. The circumferential centring is facilitated by the laser beam emitted by the laser source 80 which allows to visualize a spatial reference point on the inner surface 16 of the tyre. Preferably it is provided to treat the inner surface 16 of each tyre 3 at a portion of the inner surface 16 on which the respective sensing device 2 will be applied, in order to facilitate the application of the respective sensing device.

For example, the portion of inner surface of the tyre can be cleaned with detergents and/or solvents and/or by mechanical action, and/or polished by a laser action. In one embodiment, a protective adhesive patch (not shown) is previously applied to the portion of inner surface of the tyre in order to protect this portion from the dirt. For example, this patch can be applied to the green tyre, before the vulcanization step, at the portion intended to receive the sensing device. In this case, the aforesaid spatial reference point projected by the laser is made coinciding with the aforesaid protective patch, which is subsequently removed before applying the sensing device.

Subsequently, by means of the first actuator 41, the handling device is approached to the inner surface 16 of the tyre until the respective sensing device 2 housed in the coupling seat 36 is in light contact with the inner surface 16. The thrust detector of the supporting plane detects (e.g. by subtraction with respect to the weight of the tyre), the load variation generated by the light contact of the sensing device and it sends a signal on the basis of which the descent of the handling device 4 is stopped.

The application of the respective sensing device 2 to the inner surface 16 of the tyre is exemplarily carried out by applying a first force to a central portion 70 of the respective sensing device 2 by the central thrust element 39 (actuated by the second actuator 42) and maintaining the first force constant for a time equal to 1 second.

Exemplarily it is provided subsequently applying a second force to a peripheral annular portion 71 of the respective sensing device 2 and also to the central portion 70 by means of the main body 33 (actuated by the first actuator 41), maintaining the first force, and maintaining the second force constant for a time equal to 1 second.

During the application of the respective sensing device to the tyre, the elastic body 37 of the handling device allows a uniform transfer of the thrust pressure from the handling device to the sensing device. The supporting plane monitors, for compliance and/or safety purposes, the thrust force exerted by the applying system on the inner surface of the tyre by means of the handling device, during the application of the sensing device.

In an embodiment of the present invention, for each tyre 3 of the set of tyres a plurality of respective sensing devices 2, including the aforesaid respective sensing device, is taken away and applied with the method and the station of the present invention.

The invention claimed is:

1. A method for applying a sensing device to a tyre, the method comprising:
   providing a tape-shaped support and a plurality of sensing devices, each sensing device having a sensing device characteristic direction, wherein each sensing device is removably fixed to the tape-shaped support at an adhesion surface of said each sensing device;
   providing a handling device having a handling device characteristic direction;
   feeding in sequence a set of tyres for vehicle wheels;
   advancing said support for feeding in sequence said plurality of sensing devices along a respective feeding direction, wherein a first angular relation between said sensing device characteristic direction of each sensing device and said feeding direction is predetermined and is equal for all the sensing devices;
   for each tyre of said set of tyres, rigidly coupling said handling device to a respective sensing device maintaining at least a portion of said adhesion surface of said respective sensing device removably fixed to said support, wherein said rigidly coupling is performed with a predetermined second angular relation between said handling device characteristic direction and said feeding direction to achieve a predetermined third angular relation between said handling device characteristic direction and said sensing device characteristic direction;
   maintaining said third angular relation, completely separating said respective sensing device from said support and taking said respective sensing device away by said handling device; and
   maintaining said third angular relation, applying said respective sensing device to an inner surface of said each tyre by said handling device arranged in order to achieve a predetermined fourth angular relation between said handling device characteristic direction and a direction of intersection of an equatorial plane with the inner surface of said each tyre.

2. The method according to claim 1, wherein the rigidly coupling said handling device to said respective sensing device comprises displacing said handling device along a direction substantially perpendicular to a lying plane of said adhesion surface.

3. The method according to claim 1, further comprising:
   displacing a displacement direction of said handling device, perpendicular to a lying plane of said adhesion surface, along a transversal direction perpendicular to said feeding direction and parallel to said lying plane.

4. The method according to claim 1,
   further comprising, previously to said rigidly coupling said handling device to said respective sensing device, partially separating said respective sensing device from said support maintaining said portion of adhesion surface removably fixed to said support,
   wherein said completely separating said respective sensing device from said support occurs substantially simultaneously with said taking said respective sensing device away by said handling device.

5. The method according to claim 4, wherein said completely and partially separating the respective sensing device from the support comprises:
   advancing said support and turning said support around an edge; and
   resting a further portion of adhesion surface of said respective sensing device onto a supporting surface, said further portion of adhesion surface being separated from said support, said supporting surface being a non-stick surface.

6. The method according to claim 1, wherein applying said respective sensing device to an inner surface of said each tyre comprises:
   applying a first force to a central portion of said respective sensing device; and
   subsequently applying a second force to a peripheral annular portion of said respective sensing device.

7. The method according to claim 6, wherein the first force and the second force are maintained constant for a time between 30 and 90 seconds.

8. The method according to claim 1, wherein:
   said handling device comprises, at a first longitudinal end, a coupling seat counter-shaped to said sensing device,
   the rigidly coupling said handling device to said respective sensing device comprises fitting said coupling seat onto said sensing device,
   at least a superficial portion of said coupling seat is elastic and has a cross-section smaller than a corresponding cross-section of said sensing device, and
   taking said respective sensing device away from said support comprises retaining said respective sensing device by means of said coupling seat.

9. The method according to claim 1, wherein said portion of adhesion surface is greater than or equal to 1% of the whole adhesion surface.

10. A station for applying a sensing device to a tyre, the station comprising:
    a handling device having a handling device characteristic direction;
    a first apparatus comprising:

i) an advancement system for advancing a support, the support having a tape-shaped conformation and on which a plurality of sensing devices are removably fixed at a respective adhesion surface of each sensing device, for feeding in sequence said plurality of sensing devices along a feeding direction, wherein a first angular relation between a sensing device characteristic direction of each sensing device and said feeding direction is predetermined and is equal for all the sensing devices, ii) a coupling system for coupling said handling device with said each sensing device at a coupling bay, wherein said each sensing device has at least a portion of said adhesion surface removably fixed to said support, the coupling system being configured to achieve a predetermined second angular relation between said handling device characteristic direction and said feeding direction to achieve a predetermined third angular relation between said handling device characteristic direction and said sensing device characteristic direction of said each sensing device, wherein the handling device is configured to rigidly maintain said third angular relation, and iii) a separation system for separating said support from each sensing device at a separation bay; and a second apparatus, comprising:

i) a positioning system for positioning a respective tyre for said each sensing device, and ii) an application system for applying said each sensing device to an inner surface of the respective tyre, wherein the application system comprises a housing seat of said handling device, the housing seat being structured to achieve a predetermined fourth angular relation between said handling device characteristic direction and a direction of intersection of an equatorial plane with the inner surface of said each tyre when positioned in the positioning system.

11. The station according to claim 10, wherein said coupling system comprises a guide shaped for removably and slidably housing said handling device, wherein said guide is shaped to allow the handling device to slide along a direction substantially perpendicular to a lying plane of the adhesion surface and wherein said guide is structured for housing said handling device with a predetermined angular orientation about an axis perpendicular to said lying plane.

12. The station according to claim 10, wherein said coupling system comprises a fixed frame, a movable frame and a guide rigidly fixed to said movable frame, wherein said movable frame is displaceable, with respect to said fixed frame, along a transversal direction perpendicular to said feeding direction and parallel to a lying plane of the adhesion surface.

13. The station according to claim 10, wherein said separation system is configured to maintain said portion of adhesion surface removably fixed to said support when said each sensing device is in the separation bay and wherein said coupling bay coincides with the separation bay.

14. The station according to claim 10, wherein:

said separation system comprises an edge at the separation bay, said first apparatus comprises a supporting system for supporting a further portion of adhesion surface complementary to said portion of adhesion surface, said supporting system is placed at the separation bay, and said supporting system comprises a respective non-stick supporting surface.

15. The station according to claim 11, wherein:

said coupling system comprises a further guide integral with a movable frame and having a main development along said feeding direction, said further guide is shaped to be slidably engaged by said each sensing device upstream of a guide, and said further guide comprises an invitation portion, in distal position with respect to said guide, having inclined walls converging moving along said feeding direction.

16. The station according to claim 10, wherein:

said positioning system comprises a centring system for centring said respective tyre with respect to said application system, said centring system comprises a pair of mutually facing and parallel surfaces, the surfaces being symmetrically movable with respect to a median plane parallel to the surfaces and placed according to a predetermined spatial relation with respect to the application system, said second apparatus comprises a supporting plane of said tyre, the supporting plane comprising a detector of a thrust exerted by said tyre onto the supporting plane, and the supporting plane is movable along a radial direction of said tyre, when present.

17. The station according to claim 10, wherein:

said handling device comprises, at a first longitudinal end, a coupling seat counter-shaped to said sensing device, and at least a superficial portion of said coupling seat is elastic and has a cross-section smaller than a corresponding cross-section of said sensing device.

18. The station according to claim 10, wherein said portion of adhesion surface is greater than or equal to 1% of the whole adhesion surface.

* * * * *